United States Patent [19]

Inagami et al.

[11] Patent Number: 4,782,441
[45] Date of Patent: Nov. 1, 1988

[54] VECTOR PROCESSOR CAPABLE OF PARALLELY EXECUTING INSTRUCTIONS AND RESERVING EXECUTION STATUS ORDER FOR RESTARTING INTERRUPTED EXECUTIONS

[75] Inventors: Yasuhiro Inagami, Kodaira; Shigeo Nagashima, Hachioji; Koichiro Omoda, Sagamihara; Takayuki Nakagawa, Kokubunji; Teruo Tanaka, Hachioji, all of Japan

[73] Assignee: Hitachi, Ltd., Tokyo, Japan

[21] Appl. No.: 872,396

[22] Filed: Jun. 10, 1986

[30] Foreign Application Priority Data

Jun. 14, 1985 [JP] Japan .............................. 60-128124

[51] Int. Cl.4 ............................ G06F 9/28; G06F 7/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,840,861 | 10/1974 | Amdahl et al. | 364/200 |
| 4,128,880 | 12/1978 | Cray, Jr. | 364/200 |
| 4,199,811 | 4/1980 | Borgerson et al. | 364/200 |
| 4,229,790 | 10/1980 | Gilliland et al. | 364/200 |
| 4,274,138 | 6/1981 | Shimokawa | 364/200 |
| 4,365,311 | 12/1982 | Fukunaga et al. | 364/900 |
| 4,435,765 | 3/1984 | Uchida et al. | 364/200 |
| 4,438,492 | 3/1984 | Harmon, Jr. et al. | 364/900 |
| 4,507,728 | 3/1985 | Sakamoto et al. | 364/200 |
| 4,617,625 | 10/1986 | Nagashima et al. | 364/200 |
| 4,656,578 | 4/1987 | Chilinski et al. | 364/200 |
| 4,675,806 | 6/1987 | Uchida | 364/200 |

Primary Examiner—Raulfe B. Zache
Assistant Examiner—Danh Phung
Attorney, Agent, or Firm—Antonelli, Terry & Wands

[57] ABSTRACT

In a processor such as a vector processor in which a plurality of data are processed by one instruction and a plurality of instructions are parallely processed, apparatus is provided for storing, during an interruption of the program currently being executed, the instructions being executed in the conceptual order of appearance in the program of the instruction being executed, and the sequential count of the sets of data processed. The stored information is used to restart the execution of the interrupted program at the appropriate point.

7 Claims, 8 Drawing Sheets

FIG. 2

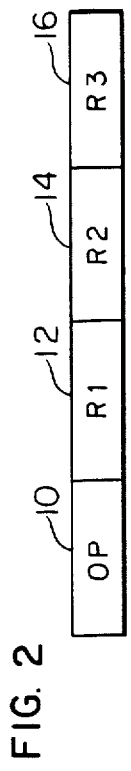

FIG. 3

| FIELD \ INSTRUCTION TYPE | OPERATION TYPE | LOAD TYPE | STORE TYPE |
|---|---|---|---|
| R1 | NUMBER OF A VECTOR REG FOR HOLDING RESULT DATA OF AN OPERATION | NUMBER OF A VECTOR REGISTER FOR HOLDING A DATA FETCHED FROM A MAIN STORAGE | NUMBER OF A VECTOR REGISTER FOR HOLDING A DATA TO BE STORED IN A MAIN STORAGE |
| R2 | NUMBER OF A VECTOR REGISTER FOR AN OPERAND DATA | NUMBER OF AN ADDRESS REG | NUMBER OF AN ADDRESS REG |
| R3 | NUMBER OF A VECTOR REGISTER FOR ANOTHER OPERAND DATA | SAME AS ABOVE | SAME AS ABOVE |

1

VECTOR PROCESSOR CAPABLE OF PARALLELY EXECUTING INSTRUCTIONS AND RESERVING EXECUTION STATUS ORDER FOR RESTARTING INTERRUPTED EXECUTIONS

BACKRROUND OF THE INVENTION

The present invention relates to a digital computer having an instruction which enables simultaneously processing a large amount of data by a single instruction.

A vector processor for high speed scientific and technical calculation which has a vector instruction for simultaneously processing a series of vector data which are groups of ordered data has been developed.

In a modern computer system, technique such as multi-programming or multi-tasking is usually used. In this technique, a plurality of programs or tasks are apparently simultaneously executed by an interruption technique to effectively utilize resources such as CPU. The term task is frequently used to mean a portion of a program divided into a certain processing unit. The multi-tasking technique is applied in various forms. For example, in a TSS (time sharing system), tasks to be executed are switched for each predetermined time width so that one processor is shared by a plurality of tasks to apparently parallelly execute a plurality of tasks.

In order to attain the multi-tasking, it is necessary to precisely detect and hold an execution status of the task being executed at the time of task switching, and when the task is re-started later, to precisely recover the execution status information held at the time of interruption.

When the multi-tasking is to be attained by the vector processor, a problem which has not been encountered in a scalar processor arises due to a characteristic of the vector processor. Namely, in the vector processor, a plurality of instructions may be being executed at the time the task is to be interrupted, and the amount of data processed may differ depending on the instruction being executed. Accordingly, it is difficult to identify the instruction to be first executed when the task is restarted.

SUMMARY OF THE INVENTION

It is an object of the present invention to provide a processor such as a vector processor which parallelly executes a plurality of instructions each requesting to process a large amount of data, characterized by means for exactly reserving execution status of instructions being executed when the task being executed is temporarily interrupted.

In accordance with the present invention, means is provided to hold conceptual order of (order of appearance in a program), instructions and the amount of data processed for each of the instructions being executed.

BRIEF DESCRIPTION OF THE DRAWINGS

These and other objects and advantages of the present invention will become apparent by reference to the following description and accompanying drawings wherein:

FIG. 2 shows a format of a vector instruction executed by the vector processor of FIG. 1;

FIG. 3 illustrates register information designated by a register field of the vector instruction of FIG. 2;

DESCRIPTION OF THE PREFERRED EMBODIMENTS

The present invention is applicable to a processor which simultaneously processes a large amount of data in a lump and in which a plurality of instructions may be simultaneously processed. In an embodiment, a vector processor which is a typical example of such processor is described.

Figure 1:
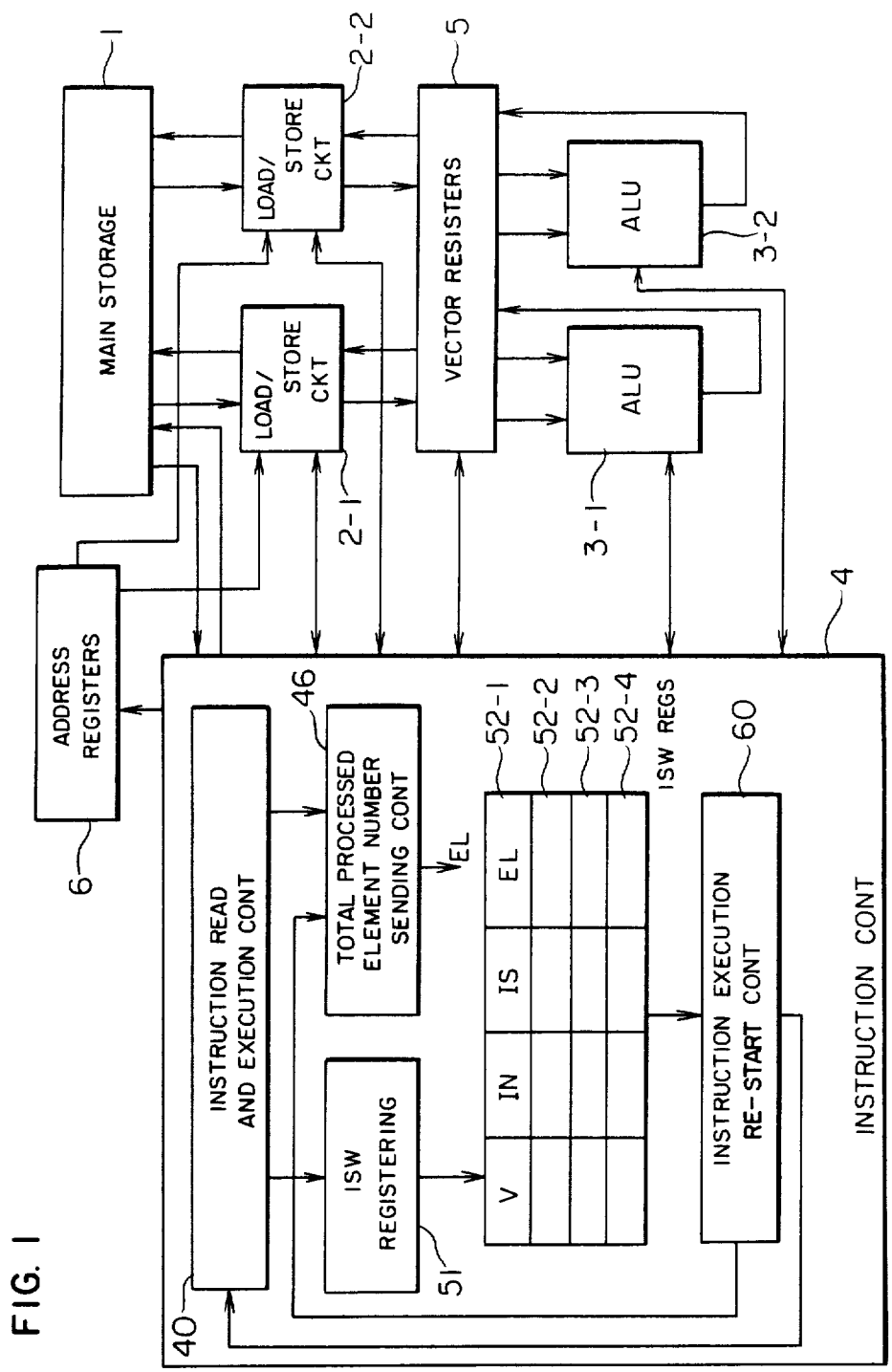
FIG. 1 shows a configuration of a vector processor in accordance with the present invention.

FIG. 1 shows a configuration of a vector processor in accordance with the present invention. Numeral 1 denotes a main storage, numerals 2-1 and 2-2 denote load/-store circuits, numerals 3-1 and 3-2 denote pipelined ALU's, numeral 4 denotes an instruction control unit, and numeral 5 denotes vector registers. The load/store circuit 2-1 controls vector data transfer between the main storage 1 and the vector registers 5. The load/-store circuit 2-2 has the same function as the load/store circuit 2-1. The pipelined ALU 3-1 processes data read from the vector registers 5 in a pipeline fashion and writes the result into the vector registers 5. The pipelined ALU 3-2 is similar to the ALU 3-1. The ALU's 3-1 and 3-2 may have different ALU functions, such as an adder function for one ALU and a multiplier function for the other ALU. The instruction control unit 4 reads out a vector instruction to be executed and decodes it, and controls the load/store circuits 2-1 and 2-2, the ALU's 3-1 and 3-2, the vector registers 5 and address registers 6, which hold data for address generation when the main storage 1 is referred.

FIG. 2 shows a format of a vector instruction executed by the vector processor shown in FIG. 1. In FIG. 2, numeral 10 denotes an operation code field (OP) for designatng a type of operation, and numerals 12, 14 and 16 denotes register number fields (R1, R2 and R3) for designating register numbers of registers to be used. The types of registers designated by the R1, R2 and R3 fields 12, 14 and 16 are different depending on the type of operation designated by the OP field 10 as shown in FIG. 3. For a vector operation instruction which requires add or multiply operation, the R1 field 12 designates the vector register number to which the operation result is to be written, and the R2 field 14 and the R3 field 16 designate the vector register numbers which hold vector data to be processed (for example, an addend and a summand for the addition). For a vector load instruction which requires to transfer the vector data from the main storage 1 to the vector register, the R1 field 12 designates the vector register number to which the vector data fetched from the main storage 1 is written, and the R2 field 14 and the R3 field 16 designate the address register numbers which indicate the storage locations of the vector data on the main storage 1. For a vector store instruction which requires to transfer the vector data from the vector register to the main storage 1, the R1 field 12 designates the vector register number in which the data to be transferred to the main storage 1 is stored, and the R2 field 14 and the R3 field 16 designate the address register numbers which indicate the storage locations on the main storage 1 in which the data read from the vector register designated by the R1 field 12 is to be stored. The vector operation instruction is executed by using the ALU 3-1 or 3-2 and the vector registers 5, and the vector load instruction or the vector store instruction is executed by using the load store circuit 2-1 or 2-2, the vector registers 5 and the address registers 6. In the following description, the load/store circuits 2-1 and 2-2, and the ALU's 3-1 and 3-2 are called resources. Those resources are parallelly operable and a plurality of instructions are parallelly executed.

The present invention is characterized by the instruction control unit of FIG. 1 which is constructed to allow interruption of the program being executed in the course of parallel execution of a plurality of vector instructions and subsequent exact re-start (task switching) of the program. In addition to a conventional instruction fetch/execution control unit 40, instruction status word (ISW) registers 52-1–52-4, an ISW registration unit 51, an instruction execution resume control unit 60 and a number of processed elements sending unit 46 are provided. The operations of those circuits are explained below.

Each time the instruction fetch/execution control unit 40 instructs start of execution of a new instruction, the ISW registration unit 51 sets an order signal IN of an order of appearance of that instruction in the program and that instruction IS into the ISW register 52-$i$ ($i=1$, 2, 3 or 4) and sets a V bit of that register to "1". The ISW registers 52-$i$ each has a number-of-processed-element field EL. The content thereof is incremented by one each time the started instruction is executed for one vector element. Thus, the ISW registers 52-$i$ ($i=1–4$) hold the ISW's for the instructions being executed.

If the task is interrupted by some cause, the ISW's in the ISW registers 52-$i$ ($i=1–4$) are saved into the main storage 1, and another task is executed after the interruption. Thereafter, the saved ISW's are again stored into the ISW registers 52-$i$ ($i=1–4$).

The instruction execution re-start control unit 60 sequentially selects the instructions in the ISW's such that the instructions in the ISW's are executed in the order of apperance in the program, and sends them to the instruction fetch/execution control unit 40 for execution. It also sends the number EL of processed elements for the selected instructions to the number-of-processed-element sending unit 46, which sends out the number EL of processed elements to the resources which execute the selected instructions. In this manner, the interrupted instruction is reexecuted for the elements other than the processed elements.

The instruction control unit 4 is explained in further detail.

Figure 4:
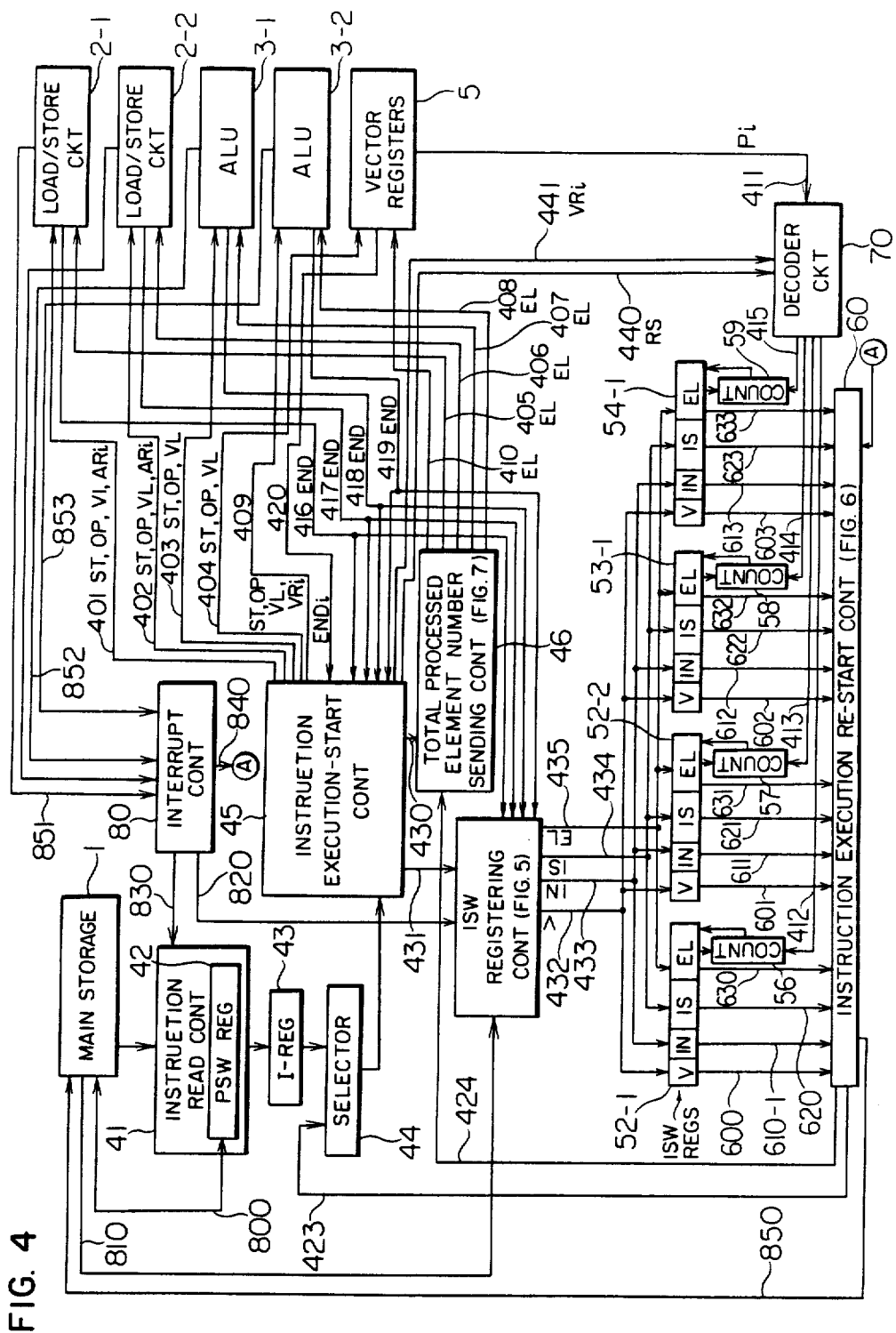
FIG. 4 shows an instruction control unit 4 of the vector processor of FIG. 1.

FIG. 4 shows a detail of the instruction control unit 4 of FIG. 1.

[Vector instruction fetch/execution start control]

Numeral 41 denotes an instruction fetch control unit, numeral 42 denotes a program status word (PSW) register, numeral 43 denotes an instruction register, numeral 44 denotes a selector, numeral 45 denotes an instruction execution control unit and numeral 46 denotes a number-of-processed-element sending unit. The PSW register 42 is similar to one in a conventional processor and holds processor status information and an address on the main storage at which an instruction to be next fetched for execution is stored. The address is called a next instruction address (NIA). The instruction fetch control unit 41 fetches the instruction from the address indicated by the next instruction address in the PSW 42 and sets the fetched instruction into the instruction register 43. The instruction set in the instruction register 43 is sent to the instruction execution start control unit 45 through the selector 44. The instruction execution start control unit 45 decodes the instruction and checks whether the resources such as vector registers, ALU's and load/store circuits to be used by the instruction are available to determine whether the instruction execution can be started. If the instruction execution is not permitted, the instruction execution start control unit 45 waits until the instruction execution is permitted, when it sends the following information to the ALU 3-1 or 3-2, load/store circuit 2-1 or 2-2 and the vector registers to be used to execute the instruction and starts the instruction execution. The information sent to the load store circuit 2-1 or 2-2, the ALU 3-1 or 3-2 and the vector registers 5 are shown below.

(1) Start of processing signal ST (2) Type of instruction OP (load or store for the load/store circuit 2-1 or 2-2)

(3) The number of vector elements VL to be processed.

The following information is sent to the address registers 6

(4) Address register number $AR_i$ to be used, of the address registers 6 (FIG. 1).

The following information is sent to the vector registers 5

(5) Vector register numbers $VR_i$ to be used.

The instruction execution start control unit 45 may be readily constructed by those skilled in the art by using the technique disclosed in Japanese Patent Unexamined Publication No. 58-114274 or corresponding U.S. patent application Ser. No. 453,094 which issued as U.S. Pat. No. 4,617,625 entitled "Vector Processor". These are incorporated herein by reference.

Signal lines 401 and 402 are used to send the information (1)–(4) to the load/store circuits 2-1 and 2-2, respectively. Signal lines 403 and 404 are used to send the information (1)–(3) and (5) to the ALU's 3-1 and 3-2. A signal line 409 is used to send the information (1)–(3) and (5) to the vector registers 5. When the instruction execution is to be started, the number-of-processed-element sending unit 46 sends the number-of-processed-element EL to the load/store circuit 2-1 or 2-2, the ALU 3-1 or 3-2 and the vector registers 5 through lines 405–408 and 410. When the instruction loaded in the instruction register 43 is decoded and the execution is started, the number-of-processed-element EL sent from the number-of-processed-element sending unit 46 is zero. The operation of the number-of-processed-element sending unit 46 in other cases will be explained later.

The manner in which the number-of-processed-element EL sent from the vector instruction execution start control unit 45 is now explained.

Figure 8:
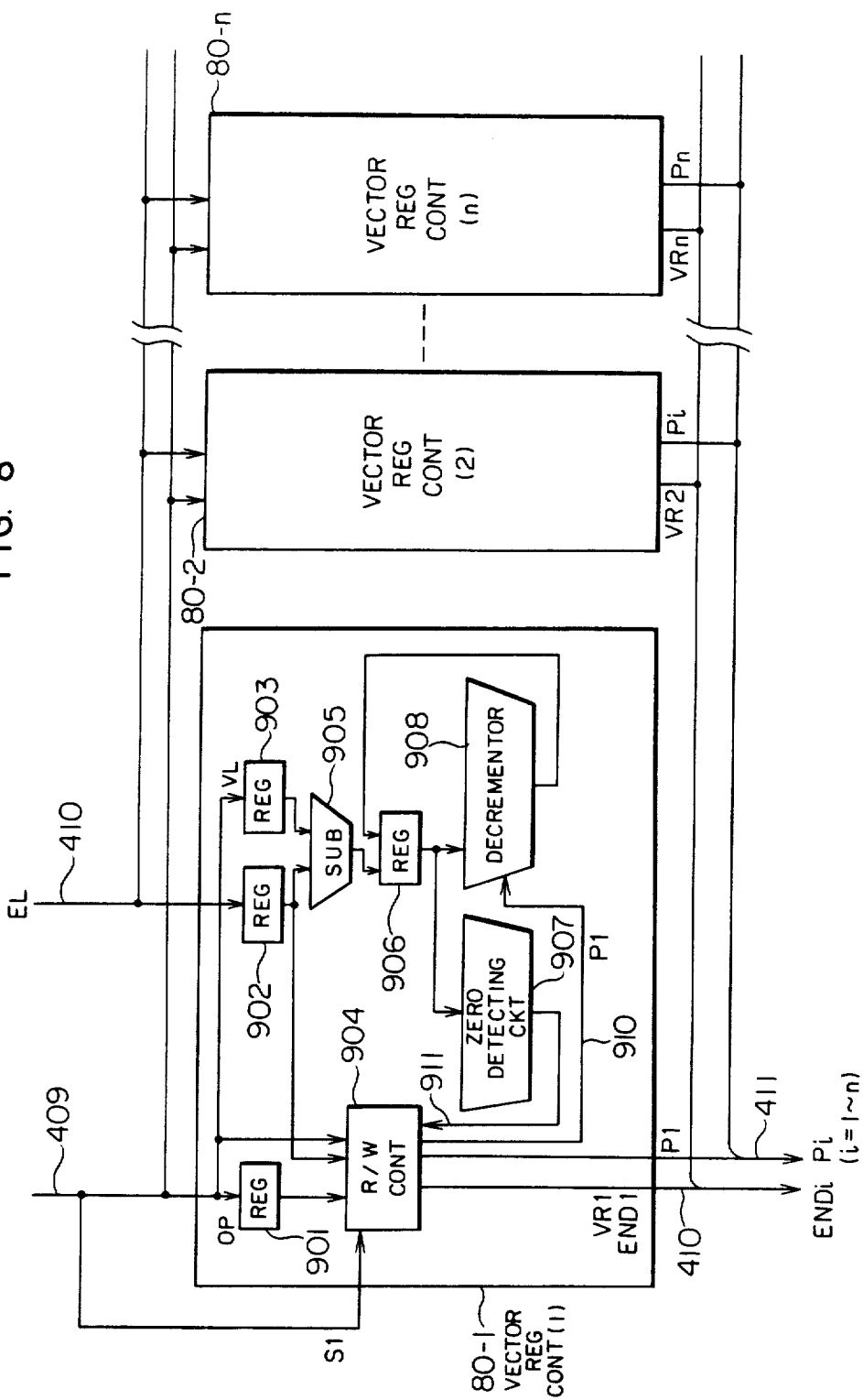
FIG. 8 shows a control unit for the vector registers 5 of FIG. 4.

FIG. 8 shows vector register control units 80-$i$ ($i=1$, 2, ... n) in the vector registers 5 which control reading and writing from and to vector registers VRj–VRn (not shown). The vector register control units 80-$i$ ($i=1, 2, \ldots$ n) are provided one for each of the vector registers VRi. The vector register 80-1 is constructed as shown below. Other vector register control unit 80-$i$ ($i=2, 3, \ldots$) are similarly constructed.

A register 901 holds the type of instruction (operation code) OP of the information sent through the signal line 409. A register 902 holds the number-of-processed-element EL sent through the signal line 410. A register 903 holds the number of vector elements VL to be processed (vector length) of the information sent through the signal line 409. Numeral 905 denotes a subtraction circuit which subtracts the content of the register 902 from the content of the register 903 and loads the difference (VL-EL) to a register 906. Numeral 907 denotes a zero detection circuit which checks if the content of the register 906 is zero or not, and numeral 908 denotes a decrementer which decrements the content of the register 906 by one each time the vector element is read or written, a read/write control circuit 904 generates a signal for reading or writing data from or to the vector register VR1 (not shown). This circuit may be readily constructed by those skilled in the art by using the technique disclosed in U.S. patent application Ser. No. 453,094 which issued as U.S. Pat. No. 4,617,625 or Japanese Patent Unexamined Publication No. 58-114274.

Only the outline of the operation of the circuit is described herein. The read/write control circuit 904 is started by the start signal ST sent through the signal line 409, and determines the resources (load/store circuit 2-1 or 2-2 and the ALU 3-1 or 3-2) with which data are exchanged in accordance with the type of instruction OP supplied from the register 901. It also detects the element in the corresponding vector register VR1 at which reading or writing of data is to be started, based on the number of processed elements EL supplied from the register 902 to start the control to read or write data from or to the vector register VR1.

In parallel therewith, the number-of-processed-element EL from the register 902 and the number-of-vector-element VL to be processed from the register 903 are supplied to the subtraction circuit 905, which calculates VL-EL which is stored in the register 906. It indicates the number of unprocessed vector elements to be processed for the instruction bring executed. When one vector element is read or written, the read/write control circuit 904 sends a signal Pi indicating thereof to the signal lines 910 and 411. The signal Pi informs to the decoder 70 (FIG. 4) through the signal line 411 that the processing of one vector element has been completed for the vector register number VRi. In response to the signal Pi on the signal line 910, the decrementer 908 decrements the content of the register 906 by one. When the zero detection circuit 907 detects that the content of the register 906 is zero, it is informed to the read/write control circuit 904 through the line 911, and the circuit 904 sends an end signal END1 to the instruction execution start control unit 45 (FIG. 4) through the signal line 420 and terminates the read or write operation for the vector register VR1.

[Registration to ISW Register]

For the instruction for which the execution has been started, the processing status in time is monitored in the following manner. Numeral 51 denotes an ISW registration control unit and numerals 52-1 to 52-4 denote ISW registers. Each of the ISW registers holds information on the instruction being executed and they are provided one for each resource such as ALU 3-1 or 3-2, or load/store circuit 2-1 or 2-2. The ISW registers 52-1 to 52-4 correspond to the load/store circuits 2-1 and 2-2 and the ALU's 3-1 and 3-2, respectively.

Each ISW register has four fields for holding the following four information (1) Valid flag V: a flag for indicating whether the information held in the corresponding ISW is valid or not. When the flag is "1", the information is valid. (2) Instruction number IN: a number to indicate a conceptual order of the corresponding ISW to other ISW, that is, which one first appears in the program. (3) Instruction IS: Instruction word itself (4) The number-of-processed-element EL: The number of elements for which processing has been completed.

When execution of one instruction is started, the ISW registration control unit 51 receives information 431 on that instruction from the instruction execution control unit 45 and performs the following operations. (The construction of the circuit 51 will be explained later with reference to FIG. 5.)

(1) Calculates an instruction number IN of that instruction. The instruction number IN is reset when the machine is initialized upon power-on and incremented one at a time each time execution of one instruction is started.

(2) Sets the ISW of that instruction into the ISW register 52-$i$ corresponding to the resource which executes that instruction. Namely, it determines which one of the resources, the ALU's 3-1 or 3-2 and the load/store circuit 2-1 or 2-2 executes the instruction and sets the ISW into the ISW register 52-$i$ ($i=1, 2, 3$ or 4) corresponding to that resource. Namely, "1" is set into the field V of the ISW register 52-$i$, the instruction number IN calculated in (1) is set into the field IN, the instruction itself is set into the field IS, and an initial value "0" is set into the EL field.

Figure 5:
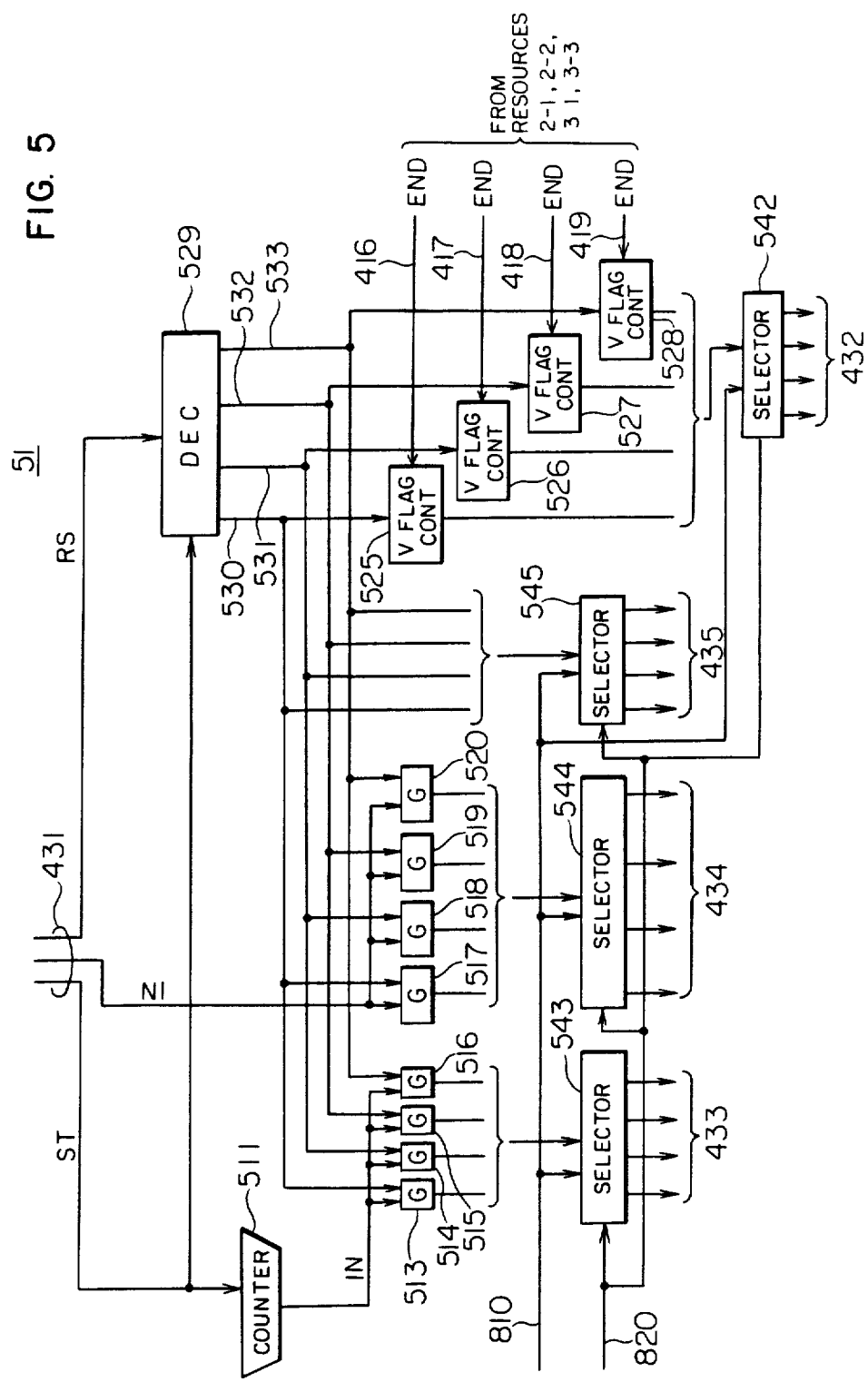
FIG. 5 shows an ISW registration control unit 51 of FIG. 4.

FIG. 5 shows a detail of the ISW registration register 51. Signals supplied to the control unit 51 from the instruction execution control unit 45 through a line 431 are the signal ST which instructs the initiation of the instruction execution, the instruction IS itself to be newly executed and the resource number RS which indicates whether the resource which executes the new instruction is the load/store circuit 2-1 or 2-2 or the ALU 3-1 or 3-2. Numeral 511 denotes a counter which counts up the signal ST and supplies the content thereof as the instruction number IN, numerals 513-516 denote gates for sending the instruction number IN to the ISW registers 52-1 to 52-4 (FIG. 4), respectively, numerals 517-520 denote gates for sending the instruction IS to the ISW registers 52-1 to 52-4, numeral 529 denote a decoder which decodes the resource number RS and turns on one of the lines 530-533 depending on whether the resource number RS designates the load/store circuit 2-1 or 2-2 or the ALU's 3-1 or 3-2, numeral 528 a valid flag generation circuit which sets the fields V of the ISW registers 52-1 to 52-4 in accordance with the output of the decoder 529 and resets them in response to the signals END 416-419 supplied when the instruction executions by the load/store circuits 2-1 and 2-2 and the ALU's 3-1 and 3-2 are completed, respectively, and numerals 542-545 denote selectors which select the data on the data line 810, when an interrupt control signal is supplied thereto from the signal line 820 and select the outputs of the valid flag generation circuits 525-528, the outputs of the gates 513-516, the outputs of the gates 517-520 and the outputs 530-533 of the decoder 529 and sends them out to the lines 432-435 in other cases. The interrupt control will be explained later.

When the start of execution signal ST for the new instruction is supplied through the signal line 431, the counter 511 counts up it to update the output instruction number IN. One of the gates 513–516 is opened by the outputs 530–533 of the decoder 529 and the new instruction is executed. The instruction number In is sent to only one ISW register 50-$i$ ($i=1, 2, 3$ or 4) corresponding to the resource through the line 433. The instruction IS to be newly executed sent through the signal line 431 is sent to the ISW register 50-$i$ through the line 434 by the gates 517–520 and the decoder 529. The ON output of the outputs 530–533 of the decoder 529 is sent to the one ISW register through the line 435 to reset the number-of-processed-element fields EL to "0". One of the valid flag generation circuits 525–528 responds to the ON output of the decoder 529 to set the field V of the one ISW register 52-$i$ through the line 432.

With the arrangement of the ISW registration control unit 51 described above, the instruction status words (ISW) of the instructions sequentially executed are registered into the registers 52-1 to 52-4.

[Updating of ISW registers]

In FIG. 4, as the ISW corresponding to the instruction for which the execution has been started is set into the ISW register 52-$i$, the number-of-processed-element (EL) field of the ISW register 52-$i$ is updated as the instruction is executed. Namely, whenever a vector element obtained as a result of execution of a vector operation instruction or a vector load instruction is within in one of the vector registers 5, vector element is read from the vector register as a result of execution of a vector operation instruction or a vector store instruction, the vector register produces a signal Pi indicating thereof on the line 411. The decoder 70 decodes the signal Pi to determine the instruction for which one element has been written and produces the number-of-processed-element EL update signal to the signal line 412–415 depending on whether the instruction for which one element has been written was processed by the load/store circuit 2-1 or 2-2 or the ALU 3-1 or 3-2. Those signals may be simultaneously produced in some cases if a plurality of instructions are processed by the respective ALU's.

Figure 9:
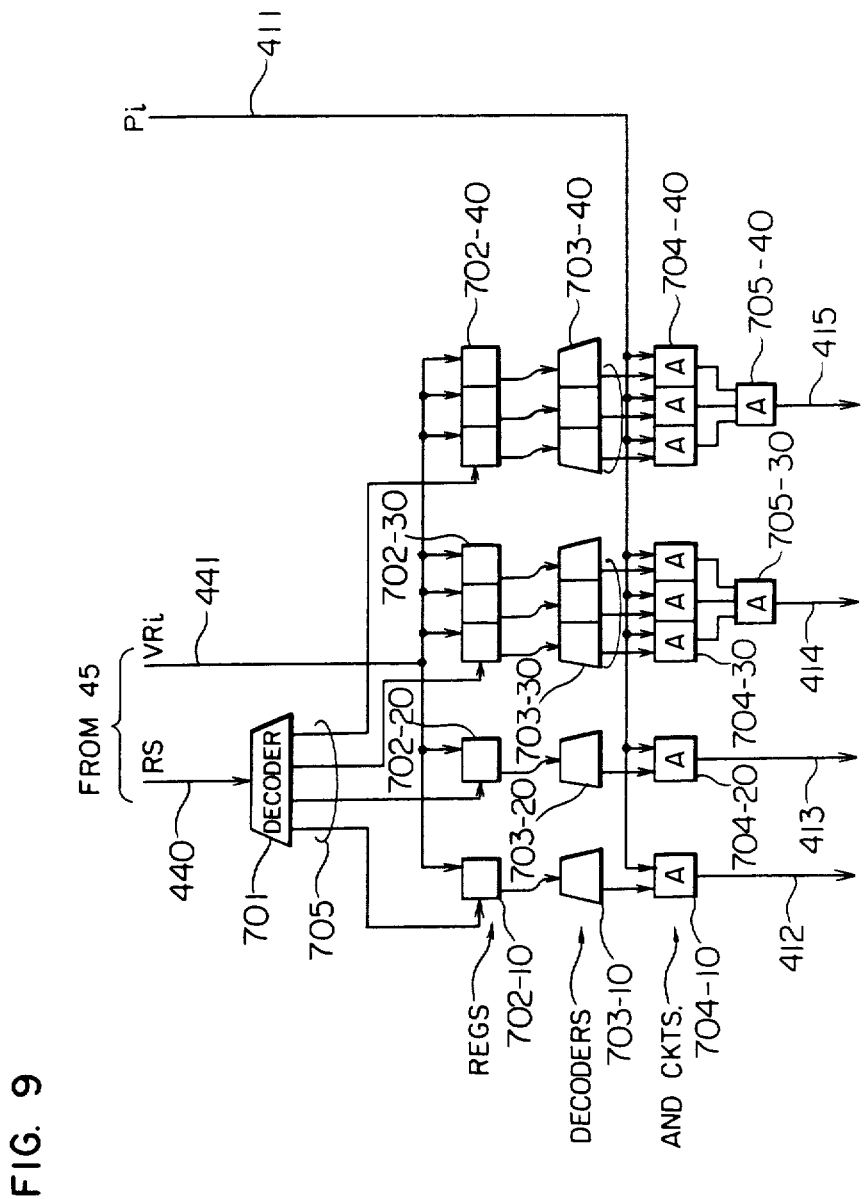
FIG. 9 shows the decoder 70 of FIG. 4.

A detail of the decoder 70 is explained with reference to FIG. 9. Numeral 701 denotes a decoder which decodes information RS which is sent from the instruction execution start control unit 45 through the signal line 440 and which relates to the resource (one of the load/store circuits 2-1 and 2-2 and the ALU's 3-1 and 3-2) used by the instruction for which the execution has been started, and instructs to one of registers 702-$i$ ($i=10, 20, 30, 40$) through the line 70 to set the vector register number on the line 441. The instruction execution start control unit 45 informs the vector register number VRi used by the instruction for which the execution has been started, through the signal line 441. Numerals 702-$i$ ($i=10, 20, 30, 40$) denote registers provided one for each resource for holding the vector register numbers used by the instructions executed by the respective resources. The registers 702-10, 702-20, 702-30 and 702-40 correspond to the load/store circuits 2-1 and 2-2 and the ALU's 3-1 and 3-2, respectively. The registers 702-30 or 702-40 can hold the vector register number which holds the input operand to the ALU 3-1 or 3-2 and the vector register number which holds the output operand. Numeral 703-$k$ ($k=10, 20, 30, 40$) denote decoders which decode the vector register number VR$_i$ held in the registers 702-$k$ ($k=10, 20, 30, 40$) to produce signals q$_{ki}$ ($k=10, 20, 30, 40$). It is apparent that each of signals q$_{30j}$ and q$_{40j}$ consists of three signals. Numeral 704-$i$ ($i=10, 20, 30, 40$) denote AND circuit each of which produces a "1" output only when the vector element processing end signal Pi ($i=1, 2, \ldots n$) of the corresponding vector register sent from the signal line 411 and the output q$_{ij}$ of the decoder 703-$i$ relate to the same vector register. Numerals 704-30 and 704-40 also denote AND circuits each of which ANDs three outputs from the AND circuits 703-30 and 703-40. The outputs of the AND circuits 704-10, 704-20, 705-30 and 705-40 activate the counters 56–59 (FIG. 4). In this manner, the field EL of the ISW register 52-$i$ ($i=1, 2, 3, 4$) corresponding to the instruction which designates the vector register in which the vector element has been processed is updated.

Numerals 56–69 denote incrementers to which the contents of the fields EL of the ISW registers 52-1 to 52-4 are supplied, and when they receive the number-of-processed-element update signal 412–415, they increment them by one and store the incremented values in the fields EL of the ISW registers 52-1 to 52-4. Thus, the fields EL of the ISW registers always indicate how many elements the vector instruction being executed in the corresponding resources (ALU's 3-1 and 3-2 and load/store circuits 2-1 and 2-2) have processed. The load/store circuits 2-1 and 2-2 and the ALU's 3-1 and 3-2 produce END signals on respective lines 416–419 when the executions of the instructions by the respective resources are completed for the specified number-of-vector element VL. The vector registers 5 produces signal ENDi on the line 420 when the execution of one instruction has been completed for the specified number of vector elements for the vector register VR$_i$ ($i=1, 2, \ldots n$). The signal END from one of the signal lines 416–419 or the signal ENDi from the signal line 420 is supplied to the instruction execution start control unit 45 so that the circuit 45 detects when the ALU 3-1 or 3-2 or the load/store circuit 2-1 or 2-2 or the vector register VR$_i$ used by the executed instruction becomes available. When the end of instruction execution signal ENDi is supplied from one of the signal lines 416–419 to the ISW registration control unit 51, it resets the field V of the ISW register 52-$i$ corresponding to the resource which produced that signal, to "0". In this manner, the ISW's of the instruction are sequentially registered in the ISW registers 52-1 to 52-4.

[Operation of Task Switch]

The operation of the task switch which interrupt the execution of the program to start (or resume) the execution of another program is explained. The operation of the task switch is attained by storing the contents of the PSW register 42 and the ISW registers 52-1 to 52-4 of FIG. 4 into the main storage 1, reading out the PSW and the ISW stored at the designated areas of the main storage 1 and loading them into the PSW register 42 and the ISW registers 52-1 to 52-4. Those operations are called PSW swap and ISW swap. The PSW swap and the ISW swap for the interruption are performed in the following manner. When the interrupt request is generated in the load/store circuit 2-1 or 2-2 or the ALU 3-1 or 3-2, it is reported to the interrupt control unit 80 through the signal lines 851–854. When the interrupt control unit 80 receives the interrupt request report, it instructs the PSW swap through the signal line 830. The content of the PSW is swapped with the content of the main storage 1 through the signal line 800 by a known method. It also instructs the ISW swap to the instruction execution resume control unit 61 through the signal line 840. The contents of the ISW registers 52-1 to 52-4 are sequentially saved into the main storage 1 through the signal line 850. Then, it instructs the ISW swap to the ISW registration control unit 51 through the signal line 820. In the ISW registration control unit 51, the selectors 542-545 shown in FIG. 5 are activated to sequentially set the new ISW's sent from the main storage 1 through the signal line 810 into the ISW registers 52-1 to 52-4. Depending on the cause of interruption, the contents of the PSW register 42 and the ISW registers 52-1 to 52-4 are stored in the specified areas of the main storage 1, then the PSW and ISW are read from the areas of the main storage 1 predetermined in accordance with the cause of interruption and set into the PSW register 42 and the ISW registers 52-1 to 52-4.

Thus, if the interrupt request occurs when a plurality of instructions are simultaneously executed, the execution status of the programs can be exactly preserved by the ISW swap and the PSW swap.

Of the ISW's newly set by the ISW swap, the ISW having "1" in the field V is the ISW for the instruction being executed when the ISW was saved, and the restart of the instruction execution is required for that ISW. This is performed in the following manner.

(1) The instruction execution re-start control unit 60 performs the following operations.

It selects one or more ISW registers 52-1 to 52-4 which have "1" in the field V to detect the ISW registers for the instructions to be reexecuted. It checks the instruction number fields IN of the detected ISW registers and generates the ISW register numbers in the ascending order of the instruction numbers IN, that is, in the conceptual order (order of appearance in the program) of the instructions to be reexecuted. It sends the instructions IS in the fields IS of the ISW registers whose ISW register numbers were generated, to the selector 44 through the signal line 423, and sends the numbers of processed elements in the fields EL to the number-of-processed-element sending unit 46 through the signal line 424.

Figure 6:
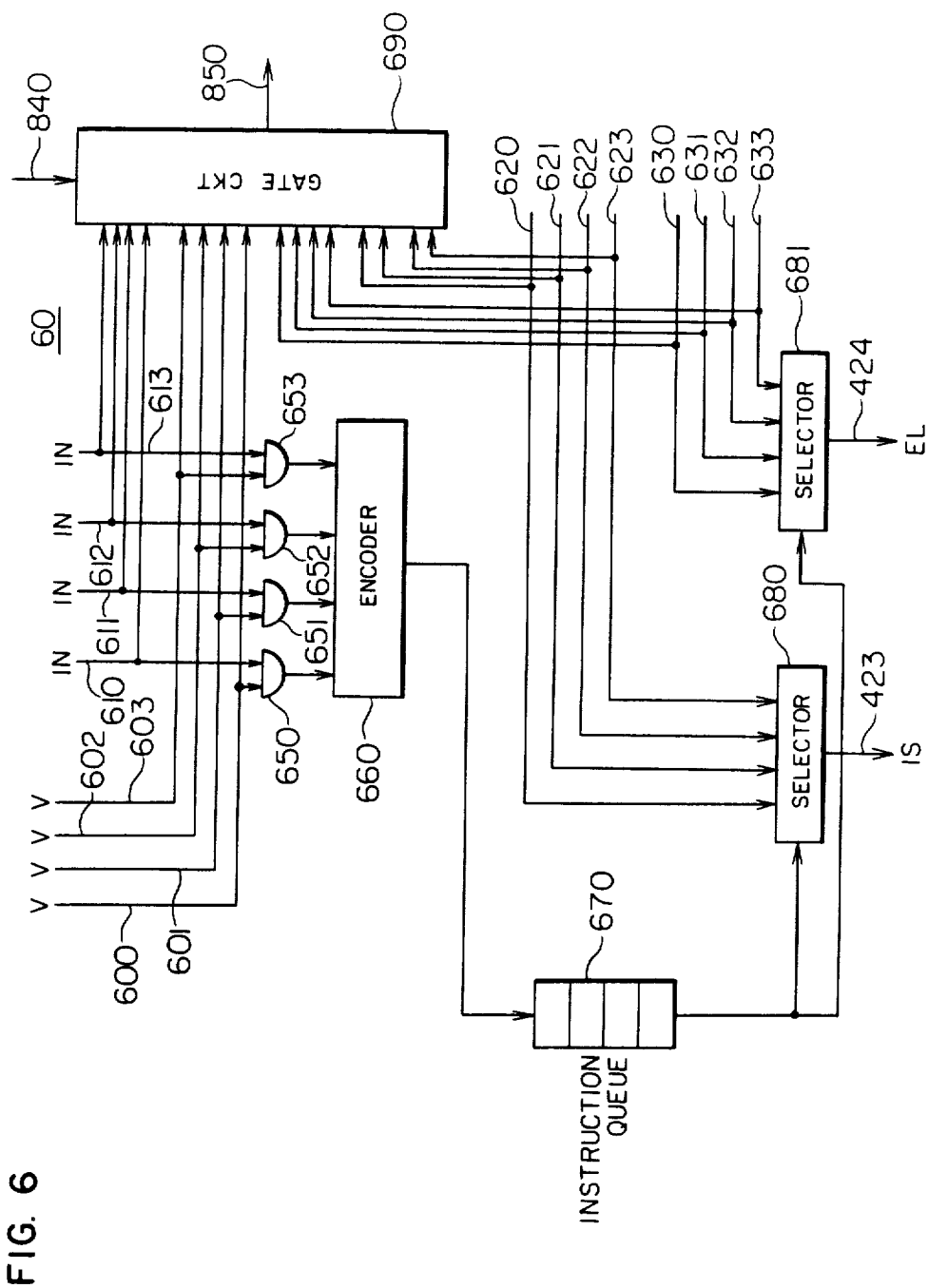
FIG. 6 shows an instruction execution re-start control unit 60 of FIG. 4.

In order to perform the above operation, the instruction execution re-start control unit 60 is configured as shown in FIG. 6.

In FIG. 6, numerals 650-653 denote gates which receive the fields V and the fields IN of the ISW registers 52-1 to 52-4 of FIG. 4 through lines 600-603 and 610-613 and produce the input field IN only when the input field V is "1". An encoder 660 examines the contents of the fields IN produced by the gates, arranges them in the ascending order and sequentially sends the corresponding ISW register numbers to a queue 670. The queue 670 sequentially reads in the ISW register numbers sent from the encoder 660 and sends them out in the first-in first-out rule. In this manner, the ISW register numbers for the instructions to be reexecuted can be sequentially designated in the conceptual order of the instructions. Selectors 680 and 681 select one of the instruction fields IS and one of the number-of-processed-element fields EL supplied from the ISW registers 52-1 to 52-4 through lines 620-623 or 630-633, in accordance with the output of the queue 670, and send them out to signal lines 423 and 424, respectively.

Numeral 690 denotes a gate circuit which sequentially sends the ISW's in the ISW registers 52-1 to 52-4 to the main storage 1 through the signal line 850 when the interrupt control is indicated through the signal line 850.

(2) In FIG. 4, during the reexecution of the instructions in the ISW registers, the selector 44 selects the instruction IS on the signal line 423 and sends it to the instruction execution start control unit 45.

(3) The instruction execution start control unit 45 controls the start of the execution of the instruction sent from the selector 44 in the same manner as that for the instruction sent from the instruction register 43.

(4) During the reexecution of the instruction in the ISW register, the number-of-processed-element sending control unit 46 sends the number-of-processed-element EL sent from the signal line 424 to the ALU 3-1 or 3-2 or the load/store circuit 2-1 or 2-2 through the lines 405-408 and to the vector registers 5 through the line 410 to inform to those circuits have many elements of the instruction to be executed have been already executed.

Figure 7:
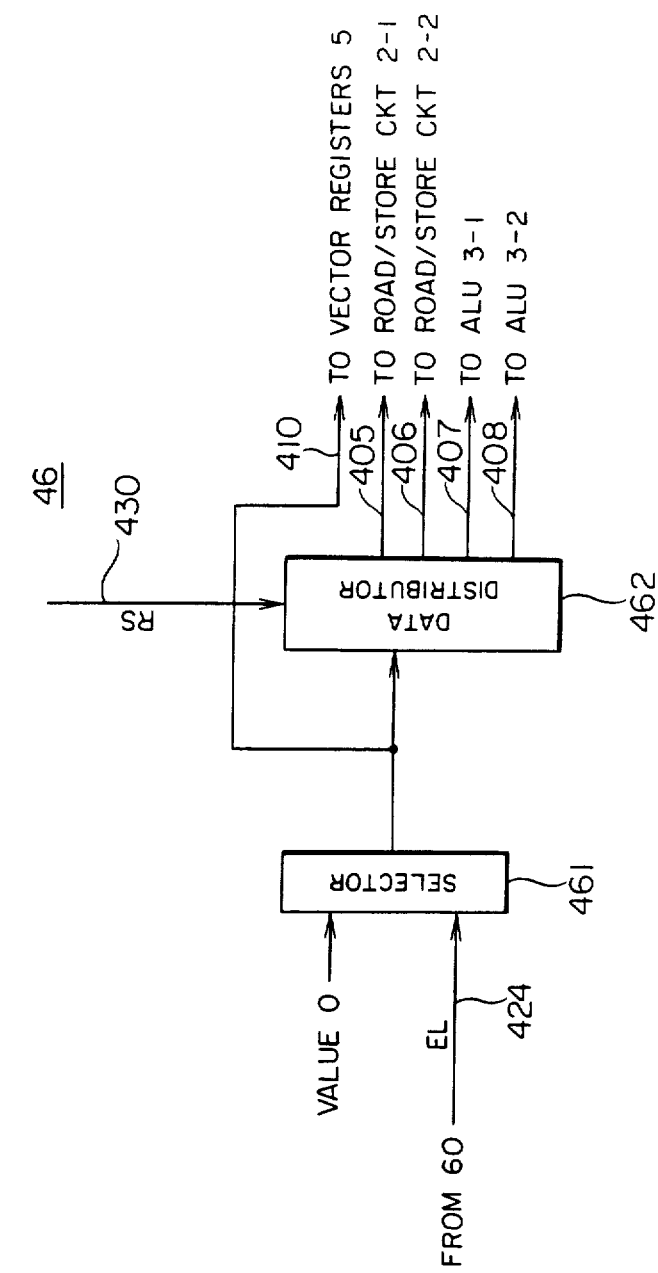
FIG. 7 shows a number of processed elements control unit 46 of FIG. 4.

FIG. 7 shows a detail of the number-of-processed-element sending unit 46. In FIG. 7, the selector 461 selects the number-of-processed-element EL supplied from the signal line 424 or a constant value "0" depending on whether the instruction in the ISW register is being reexecuted or not. A data distributor 462 responds to the resource number RS (which indicates whether the resource which executes the instruction to be newly executed is the load/store circuit 2-1 or 2-2 or the ALU 3-1 or 3-2) sent from the instruction execution start control unit 45 (FIG. 4) through the signal line 430, to send the output of the selector 461 to one of the resources through the signal line 405-408. The output of the selector 461 is also sent to the vector registers 5 through the line 410.

As described above, when the new instruction is to be executed, the value "0" is produced, and when the execution of the instruction is to be re-started, the number-of-processed-element EL of the interrupted instruction sent from the instruction execution re-start control unit 60 (FIG. 4) is sent to the resource which execute the instruction and the vector registers 5.

(5) Turning back to FIG. 4, when the operations (1)-(4) for the ISW registers which contain "1" in the fields V have been completed, the instruction execution re-start operation is terminated, and then the instruction is fetched by the address on the main memory 1 specified by the next instruction address NIA in the PSW register 42 and set into the instruction register 43. Thus, a normal operation is performed.

In this manner, at the start of the execution of the new task after the PSW swap and the ISW swap, the ISW is first examined to re-start the execution of the interrupted instruction and then the new instruction is executed. Where there are more than one interrupted instructions, those instruction executions are re-started in the conceptual order (order of appearance in the program) so that the execution of the task is exactly re-started.

As described above, in accordance with the present invention, in the processor such as vector processor which processes a plurality of data per instruction and parallelly executes a plurality of instructions, the program being executed is interrupted to start the execution of another program by the task switching operation. If there are more than one instructions being executed, the execution status of all of those instructions being executed is stored, and when the execution of the interrupted program is subsequently to be re-started, the stored information is recovered so that the switching operation is attained effectively without waste.

We claim:

1. A data processing apparatus for parallely executing a plurality of instructions each requesting an operation on a set of data signals, comprising:

instruction execution start control means for controlling the start of execution of a plurality of instructions in a program stored in a program storage means;

a plurality of parallely operable instruction execution means connected to said instruction execution start control means for executing operations requested by said instructions being executed using a plurality of sets of data signals received from a main storage or a plurality of registers wherein each set of data signals is requested by the instructions;

means connected to said instruction execution start control means for generating, every time the execution of an instruction is started, an order indicating signal indicating that an instruction to be executed appears in the program later than an instruction being executed;

means connected to said plurality of instruction execution means for counting the number of data signals already processed for the instructions being executed by said plurality of instruction execution means; and instruction status word storage means connected to said instruction execution start control means, said order indicating signal generating means and said count means for storing instruction status words for a plurality of instructions for which the execution has been started but not finished, each of instruction status words including the order indicating siganl for each instruction, a count of the number of data signals processed for each instruction and an instruction.

2. A data processing apparatus according to claim 1 further comprising:

means connected to said instruction status word storage means and responsive to a program execution interrupt request signals from an interrupt control means for temporarily saving the stored instruction status words of an interrupted program;

means connected to said instruction status word storage means and responsive to an execution restart request signal from an instruction execution re-start control means for restoring the saved instruction status words of the interrupted program back into said instruction status word storage means;

said instruction execution re-start control means connected to said instruction status word storage means for sequentially selecting the restored instruction status words in the order of appearance in the interrupted progam in response to the order indicating signals in the restored instruction status words, for sending the instructions in the selected instruction status words to the instruction execution start control means and for outputting a count of the number of data signals processed by the selected instruction status words; and means connected to said instruction execution means and said instruction execution re-start control means for selectively sending a count of the number of data signals processed to the instruction execution means which executes a respective instruction sent by said instruction execution re-start control means.

3. A data processing apparatus according to claim 1, wherein each instruction execution means comprises a plurality of ALU means for processing a plurality of data signals in response to an instruction, said data signals includes a plurality of vector elements of vector data, said plurality of ALU means being connected in a pipeline fashion, and a plurality of vector registers for holding vector data to be supplied to said plurality of ALU means or vector data received from said plurality of ALU means.

4. A data processing apparatus according to claim 3 wherein said instruction execution means further comprises a plurality of load store means for controlling the transfer of vector data between said main storage and said vector registers.

5. A data processing apparatus according to claim 4 further comprising:

a counter for counting the number of start of processing signals supplied by said instructions execution start control means and supplying the count as an instruction number;

a plurality of first gates for receiving said instruction number and supplying said instruction number to said instruction status word storage means which includes a plurality of instruction word registers;

a plurality of second gates for receiving an instruction from said instruction execution start control means and supplying said instruction to said plurality of instruction status word registers;

a decoder for decoding a resource number supplied by said instruction execution start control means and providing a plurality of signals indicating whether said resource number designates said plurality of load store means or said plurality of ALU means;

a valid flag generation means for providing an output flag in response to said plurality of indicating signals of said decoder and resetting said output flags in response to instruction execution signals provided by said load store means and said ALU means indicating that said instructions have been executed by said load store means and said ALU means; and first, second, third and fourth selectors wherein said first selector in response to an interrupt request signal from an interrupt control means selects between said instruction number output from said first gates and data from said main storage, said second selector in response to the interrupt request signal from the interrupt control means selects between said instructions from said second gates and data from said main storage, said third selector in response to the interrupt request signal form an interrupt control means selects between said plurality of indicating signals from said decoder and data from said main storage and said fourth selector in response to the interrupt request signal from the interrupt control means selects between said output flags of said valid flag generation means and data from said main storage.

6. A data processing apparatus according to claim 5 further comprising:

a plurality of gates which receives the selected outputs from said first and fourth selectors and in response to the combination thereof provides the selected output of said first selector to an encoder when output flags are provided by said fourth selector;

said encoder receives the selected output of said first selector from said plurality of gates and arranges the output in ascending order and sequentially sends a numbers corresponding to instruction status word registers to a queue;

said queue sequentially reads said instruction status word register numbers sent from said decoder and outputs said instruction status word register numbers in first-in-first-out order; and a plurality of fifth selectors which select in response to the output of said queue an instruction status word register which includes an instruction and a count of the number of data signals processed.

7. A data processing apparatus according to claim 6 wherein said count means further comprises:

a sixth selector which selects between a count of the number of data signals processed supplied from an instruction status word register selected in response to the output from said queue and a predetermined value stored in said main storage depending on whether the instruction in said instruction status word register is being re-executed, the output of said sixth selector being supplied to said vector registers; and a data distribution means which in response to a resource signal from said instructions execution start control means indicating a specific load store means of ALU means supplies the output of said sixth selector to the indicated load store means or ALU means for execution.

* * * * *